(12) United States Patent
Ogawa

(10) Patent No.: US 6,498,602 B1
(45) Date of Patent: Dec. 24, 2002

(54) OPTICAL DIGITIZER WITH FUNCTION TO RECOGNIZE KINDS OF POINTING INSTRUMENTS

(75) Inventor: Yasuji Ogawa, Saitama (JP)

(73) Assignee: Newcom, Inc., Saitama (JP)

( * ) Notice: Subject to any disclaimer, the term of this patent is extended or adjusted under 35 U.S.C. 154(b) by 91 days.

(21) Appl. No.: 09/708,767

(22) Filed: Nov. 7, 2000

(30) Foreign Application Priority Data

Nov. 11, 1999 (JP) .......................................... 11/320483

(51) Int. Cl.⁷ ..................... G06K 11/08; G06K 11/06; G09G 5/08
(52) U.S. Cl. ..................... 345/173; 345/175; 345/179; 178/18.01; 178/18.09
(58) Field of Search ................................. 345/173, 175, 345/179; 178/18.09, 18.01

(56) References Cited

U.S. PATENT DOCUMENTS

| | | | |
|---|---|---|---|
| 3,613,066 A | * 10/1971 | Cooreman | 341/5 |
| 4,811,004 A | * 3/1989 | Person et al. | 345/175 |
| 5,248,856 A | * 9/1993 | Mallicoat | 178/18.09 |
| 5,484,966 A | * 1/1996 | Segen | 178/18.09 |
| 5,525,764 A | * 6/1996 | Junkins et al. | 178/18.01 |
| 5,889,879 A | * 3/1999 | Tsai et al. | 382/123 |
| 6,100,538 A | * 8/2000 | Ogawa | 250/559.29 |

FOREIGN PATENT DOCUMENTS

JP 11-110116 A * 4/1999 ......... G06F/003/03

* cited by examiner

Primary Examiner—Steven Saras
Assistant Examiner—William C. Spencer
(74) Attorney, Agent, or Firm—Wells St. John P.S.

(57) ABSTRACT

An optical digitizer which has a function to recognize kinds of pointing instruments, allowing an input by a finger or by a pen, is provided. The optical digitizer includes: a light source to emit a light ray; an image taking device which is arranged in a periphery of a coordinate plane, and which converts an image of the pointing instrument into an electrical signal after taking an image of the pointing instrument by using the light ray of the light source; a computing device to compute the pointing position coordinates after processing the converted electrical signal by the image taking device; a polarizing device to polarize the light ray emitted by the light source into a first polarized light ray or a second polarized light ray; a switching device to switch the irradiating light on the coordinate plane to the first polarized light or the second polarized light; a retroreflective material with retroreflective characteristics, which is installed at a frame of the coordinate plane; a polarizing film with a transmitting axis which causes the first polarized light ray to be transmitted; and a judging device to judge the pointing instrument as the first pointing instrument when the image of the pointing instrument is taken by the first polarized light ray, and to judge the pointing instrument as the second pointing instrument when the image of the pointing instrument is taken by the second polarized light ray.

15 Claims, 9 Drawing Sheets

OPTICAL DIGITIZER WITH FUNCTION TO RECOGNIZE KINDS OF POINTING INSTRUMENTS

CROSS REFERENCE TO RELATED APPLICATION

This application relates to and claims priority to corresponding Japanese Patent Application No. 320483/1999, which was filed on Nov. 11, 1999, and which is incorporated by reference herein.

BACKGROUND OF THE INVENTION (1) Field of the Invention

The present invention relates to an optical digitizer, which detects the position coordinates where a finger, a stylus or a pointing stick (hereinafter refer to as a pointing instrument) points on a coordinate plane, and more specifically, to an optical digitizer, which recognizes kinds of pointing instruments and enables an input by a finger or a pen.

(2) Description of the Related Art

In recent years, mobile type pen input computers, such as PDA, are becoming increasingly popular. Many of them have pressure-sensitive resistance membrane system touch panels placed on front of LCD display devices, enabling a user to operate the computer and input a drawing by touching the touch panel, or by drawing with a finger or a pen, so that the user can use it in the same way as a normal pen and a notebook. However, in the case of inputting a signature for signature verification, or inputting a medical record into a patient's file, in which a handwriting input is important, if the user touches the touch panel with a hand, it becomes an error input due to the characteristics of the touch panel. This is called the hand-touch problem. Moreover, in the pressure-sensitive resistance membrane system touch panel, there are occasions where the surface membrane is torn by a pen due to its structural characteristics. In order to avoid such problems, an optical system digitizer has been proposed in lieu of the pressure-sensitive resistance membrane system touch panel.

FIG. 1 illustrates an example of the conventional optical digitizers. A tunnel mirror 14 is disposed in front of an image forming lens 9 for a linear image sensor 13, and a pair of detecting units, wherein each of the units is arranged in such a manner that a light axis of an LED light source 31 coincides with a light axis of the linear image sensor 13, are arranged in the peripheral area of a coordinate plane 1. The tip of a pointing instrument 2, such as a pen, is wrapped with a tape 22 composed of a retroreflective material. When a light ray emitted from LED light source 31 is irradiated on the retroreflective tape 22 at the tip of the pen 2, the incident light returns straight back to where it came from due to the retroreflective characteristic. The image of this reflected light is taken by the right and left side linear image sensors 13, and converted to an electric signal. The signal is then processed at the coordinate computing section 7 by using the triangulation principle to detect the pointed coordinates of the pen tip. In this case, unless a hand intercepts between the pen tip and the image taking means, a hand-touch is allowed. However, in this conventional example, an input by a finger cannot be made. Therefore, it cannot be used as a touch pad loaded on a notebook-type personal computer or as a simple touch panel.

Another example of a conventional optical digitizer is illustrated in FIG. 2. In the conventional example illustrated in FIG. 1, the retroreflective material is installed at the tip of the pen 2, but in the conventional example illustrated in FIG. 2, the retroreflective material is installed on the frame of the coordinate plane 1. In this case, the images in the retroreflective material 4 positioned at the two sides of the coordinate plane 1 are taken by each of the right and left image sensors 13. In other words, the right-side image sensor takes the images 4a and 4b of the retroreflective material, and the left-side image sensor takes the images 4b and 4c, respectively. When a pointing instrument 20, such as a finger, is placed on the coordinate plane 1, the reflected light from the retroreflective material 4 is intercepted by the pointing instrument 20, and the shadow image 20a is detected by the image sensor 13, which makes it possible to detect the pointed coordinates of the pointing instrument 20.

A conventional optical digitizer as illustrated in FIG. 1 allowed to input by a special pen only, which requires a pen even for making a simple input through a touch panel. Moreover, since it requires a specific pen, when it is loaded on a notebook-size personal computer, it is often inconvenient for a user. The conventional digitizer as illustrated in FIG. 2 served the purpose as far as the inputting by a pen is concerned, but it did not solve the hand-touch problem.

To solve these problems, the present invention aims to provide an optical digitizer, which has the function to recognize kinds of pointing instruments, and enables an input by both a finger and a pen. Moreover, the invention aims to provide an optical digitizer with a pointing instrument equipped with a plurality of functions by installing a supplemental information transmission means into the pointing instrument.

SUMMARY OF THE INVENTION

In order to accomplish the above mentioned objectives, the present invention relates to an optical digitizer which detects a position coordinate pointed by a pointing instrument on a coordinate plane, and has a function to recognize a first pointing instrument, which is not equipped with a retroreflective material, from a second pointing instrument, which is equipped with the retroreflective material at its tip, wherein the optical digitizer is comprised of a light source for emitting a light ray, an image taking means, which is placed in the periphery of the coordinate plane to take an image of the pointing instrument by using the light ray of the light source and convert the taken image into an electrical signal, a computing means for computing the position coordinates by processing the electrical signal converted by the image taking means, a light polarization means which is provided at the light source for polarizing the emitted light from the light source into a first polarized light or a second polarized light, a switching means with which irradiating light to the coordinate plane is switched to the first polarized light or the second polarized light, a retroreflective material having retroreflective characteristics which is provided on a frame of the coordinate plane, a polarizing film installed in front of the retroreflective material and having a transmitting axis to cause the first polarized light to be transmitted, and a judging means for judging the pointing instrument as a first pointing instrument if the image of the instrument is taken by the first polarized light, and for judging the pointing instrument as a second pointing instrument if the image of the instrument is taken by the second polarized light.

The light source means is comprised of two sources, and the polarizing means is comprised of the first polarizing means, which allows the first polarized light to transmit, and the second polarizing means, which allows the second polarized light to transmit, both the polarizing means being installed at each light source, and the first polarized light and the second polarized light are alternately illuminated by irradiating the two light sources alternately through the switching means.

It may also be arranged that the polarizing means comprises a first polarizing means, which allows the first polarized light to transmit, and a liquid crystal plate, so that the first polarized light and the second polarized light are illuminated by switching voltages applied to the liquid crystal plate by a switching means.

Further, the present invention relates to an optical digitizer which has a function to recognize kinds of a pointing instrument, wherein the optical digitizer is comprised of a light source to emit a light ray, an image taking means, installed in the peripheral area of the coordinate plane to take an image of the pointing instrument by using the light ray of the light source and to convert the taken image into an electrical signal, a calculation means to compute the pointed position coordinates by processing the converted electrical signal through the image taking means, a polarizing means which is installed in the image taking means to make the incident light as the first polarized light or the second polarized light, a dividing means to divide the incident light to the image taking means, a retroreflective material installed at the frame of aforementioned coordinate plane, which has retroreflective characteristics, a polarizing film which is installed in front of the retroreflective material, having a transmitting axis to cause the first polarized light ray to be transmitted, and a judgment means which judges the pointing instrument as a first pointing instrument if the image of the instrument is taken by the first polarized light, as a second pointing instrument if the image of the instrument is taken by the second polarized light, and as the second pointing instrument if the image of the instrument is taken by both the first and the second polarized light.

The present invention further relates to an optical digitizer wherein the light source means is comprised of two light sources, further having a third polarizing means to cause the first polarized light to be transmitted, and a fourth polarized means to cause the second polarized light to be transmitted, both of them are installed at each of the two light sources, the optical digitizer further having a switching means to cause the two light sources alternately to be emitted, the second pointing instrument having a liquid crystal material at its tip, the optical digitizer further having a judging means to judge the state of the second pointing instrument in the case where the image of the pointing instrument is taken by the second polarized light, by the polarized light which comes into the image taking means in which the polarized light changes by the voltage applied to the liquid crystal material.

The first polarized light ray may be a vertically polarized light ray, and the second polarized light ray may be a horizontally polarized light ray.

BRIEF DESCRIPTION OF THE DRAWINGS

The above descriptions and other objects, features and advantages of the present invention will be apparent from the following description of the preferred embodiments of the invention explained with reference to the accompanying drawings, in which.

DESCRIPTION OF THE PREFERRED EMBODIMENT

With reference to the accompanying drawings, preferred embodiments of the invention will be explained hereunder.

Figure 1:
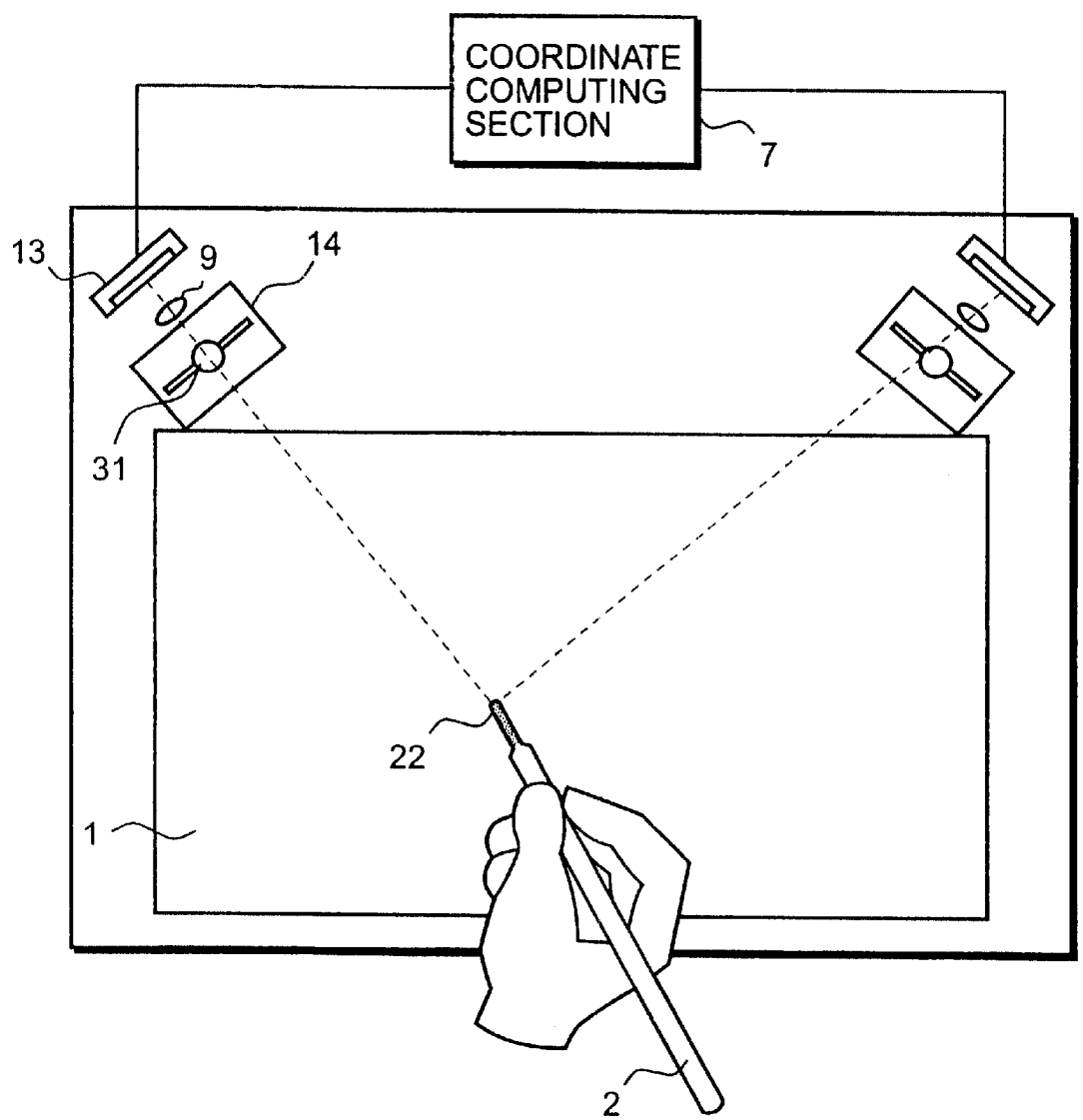
FIG. 1 is a diagrammatic view of a conventional optical digitizer which uses a reflective type pen.
Figure 2:
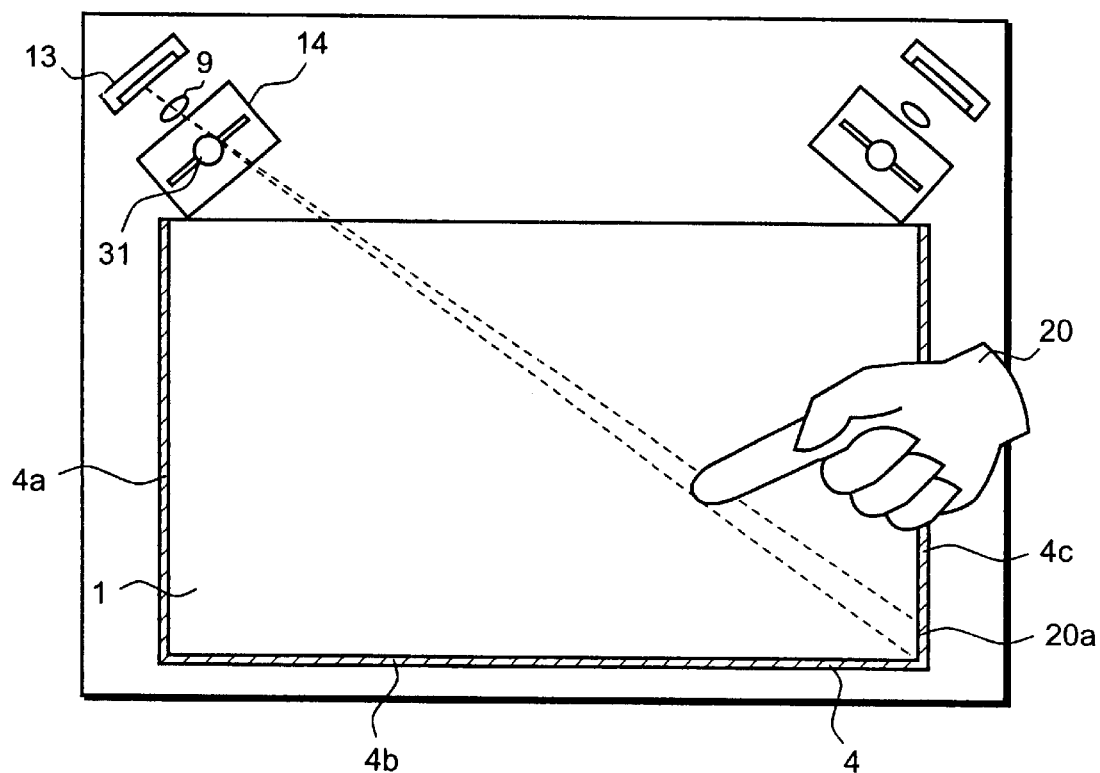
FIG. 2 is a diagrammatic view of a conventional optical digitizer which enables an input by a finger.
Figure 3:
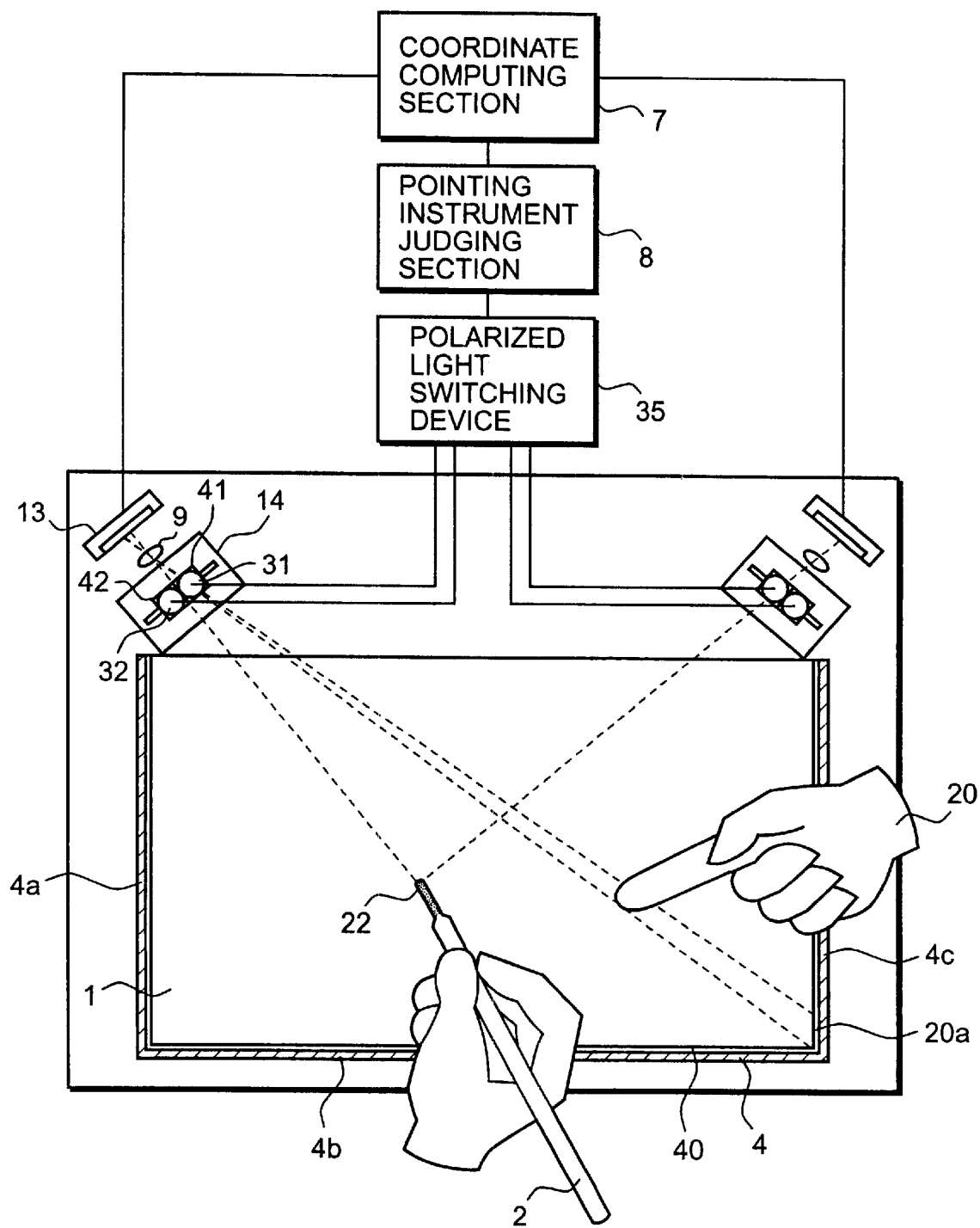
FIG. 3 is a plane view showing a first embodiment of the optical digitizer in accordance with the present invention.
Figure 4:
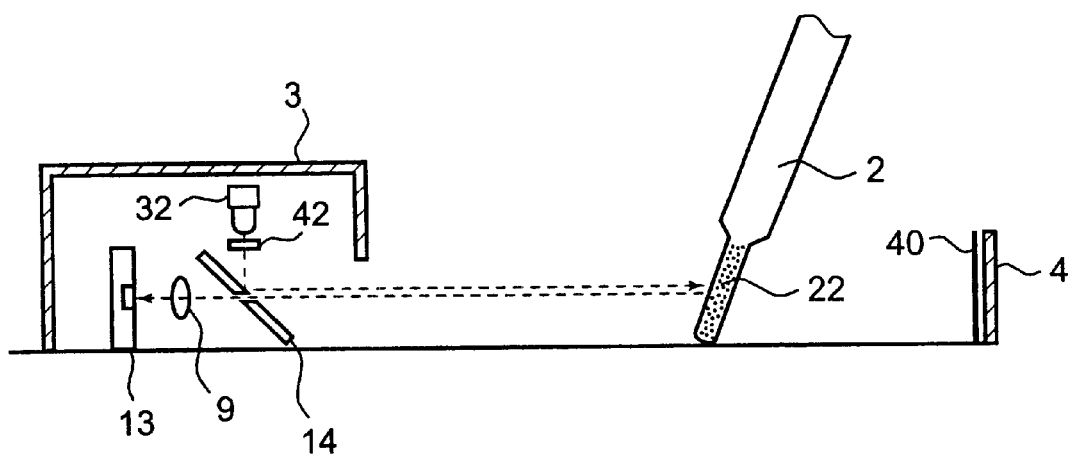
FIG. 4 is a side view of the first embodiment of the optical digitizer shown in FIG. 3.

FIG. 3 is a diagrammatic plane view to show a first embodiment of the optical digitizer in accordance with the present invention, and FIG. 4 is its schematic side view. Each detecting unit 3 is comprised of a light source, a linear image sensor 13, a lens 9 to form an image thereon, and a tunnel mirror 14 in which the light axis of the light source and the light axis of the linear image sensor are arranged to coincide. Although the fact that a retroreflective material 4 installed at the frame surrounding the coordinate plane 1 is basically the same as the prior art shown in FIG. 2, the characteristics of the present invention are that two LEDs 31 and 32 are used as the light source, polarizing films 41, 42 in which polarizing axes are orthogonal therebetween, are provided to the LEDs, and a polarizing film 40 is further installed in front of the retroreflective material 4. In the present embodiment, the detecting units on the right and left are identical in their configuration, so that only one is described and the explanation of the other is omitted. For each of the polarizing films, the vertically polarizing film 40 which allows vertically polarized light rays to be transmitted, the vertically polarizing film 41 which allows vertically polarized light rays to be transmitted, and the horizontally polarizing film 42 which allows horizontally polarized light rays to be transmitted will be described, but not limited to this description here as the reversed arrangement between vertically and horizontally can attain the same effect. The tunnel mirror can also employ a half mirror or a pin hole or the like, or it is permissible to arrange the light source and the image sensor at an extremely close distance, thus an appropriate modification can be made.

The LED 31 is equipped with the vertically polarizing film 41, and the LED 32 is equipped with the horizontally polarizing film 42 respectively, and the light emissions of the LEDs 31 and 32 are switched by a polarized light switching device 35 in order to alternately illuminate the vertically polarized light and the horizontally polarized light on the coordinate plane 1. The light ray emitted from the light source enters into the coordinate plane 1 by the tunnel mirror 14. In the case where the LED 32 is illuminated by the polarized light switching device 35 to cause the horizontally polarized light to enter into the frame of the coordinate plane 1, no image is taken by the image sensor 13 since there is no reflection from the retroreflective material 4 because of the presence of the vertically polarizing film 40 in front of the retroreflective material. In the case where the LED 31 is illuminated to cause the vertically polarized light to enter into the frame of the coordinate plane 1, the light transmits through the vertically polarizing film 41 and enters into the retroreflective material 4, and returns in the same direction as the direction in which the light came from, so that at each of the image sensors 13 at the right and the left, the image of the retroreflective material positioned at two sides of the coordinate plane 1 is reflected. In other words, by the right image sensor, the images of the retroreflective materials 4a and 4b are taken, and by the left image sensor, the images of the retroreflective materials 4b and 4c are taken, respectively. In the case where a finger 20 is placed on the coordinate plane 1 as a pointing instrument while causing the LED 31 to illuminate and to emit the vertically polarized light rays, the reflected light from the retroreflective material 4 is blocked by the finger 20, and the image of its shadow 20a is taken by the image sensor 13. On the other hand, in the case where the pen 2 equipped with the retroreflective material 22 at its tip is placed on the coordinate plane 1 as the pointing instrument while causing the LED to illuminate and to emit the horizontally polarized light rays, there is no reflected light from the retroreflective material 4 at the frame of the coordinate plane 1, so that only the reflected light from the retroreflective material 22 of the pen 2 is taken by the image sensor 13. By conducting the image taking in this manner from the right and left sides, and converting the images into electrical signals, then, from these image signals from the right and left angles, the microprocessor in a coordinate computing section 7 will determine the two dimensional coordinates (X, Y) by using the triangulation principle.

The pointing instrument judging section 8 judges whether the pointing instrument is a finger or a pen from the state of the polarization switching device 35 and the taken image signals. In other words, in the case where the image of the pointing instrument is taken by the sensor 13 when the vertically polarized light ray is illuminated, the finger 20, and in the case where the image of the pointing instrument is taken by the image sensor 13 when the horizontally polarized light ray is illuminated, then it is judged as the pen 2.

Figure 5:
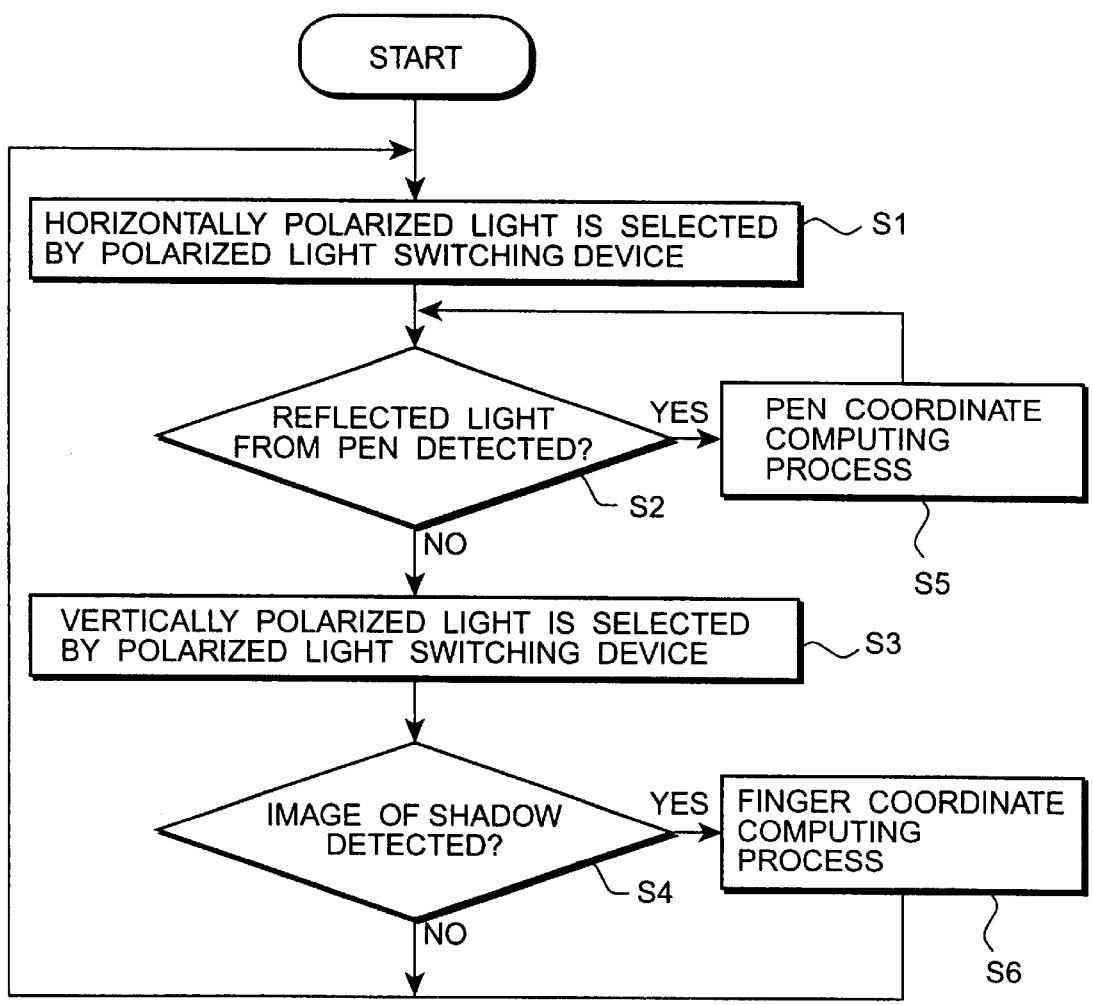
FIG. 5 is a flow chart to show the operation of the first embodiment shown in FIG. 3 in accordance with the present invention.

FIG. 5 shows a flow chart to explain the operation of the first embodiment of the optical digitizer in accordance with the present invention as illustrated in FIG. 3. First, the polarized light switching device 35 is switched to cause the LED 32 to emit light that illuminates the horizontally polarized light rays (Step S1). Next, the checking is made whether the reflected light from the retroreflective material 22 installed at the tip of the pen 2 is detected or not (Step S2). In the case where the retroreflective light from the retroreflective material 22, installed at the tip of the pen 2, is detected, the pen coordinate computing process is conducted (Step S5), the pointed position coordinates of the pen are detected, and the same procedure is repeated by returning to Step S2. On the other hand, in the case where the retroreflective light from the retroreflective material 22, installed at the tip of the pen 2, is not detected, the polarized light switching device 35 is switched and the LED 31 is made to emit the light, and the vertically polarized light rays are illuminated (Step S3). Next, the checking is made whether the reflected light from the retroreflective material 4 installed at the frame of the coordinates plane 1 is blocked by the finger 20, and the image of its shadow 20a is detected or not (Step S4). In the case where the image of the shadow 20a is detected, the finger coordinates computing process is conducted (Step S6), and after detecting the pointed position coordinates of the finger, the step returns to Step S1. In the case where the shadow image 20a is not detected, the step returns to Step S1, and the existence or non-existence of the reflected light from the retroreflective material of the pen is detected. Subsequently, this procedure is repeated at a high speed.

In this way, the optical digitizer in accordance with the present invention first detects the existence or non-existence of the pen which has the retroreflective material. If the pen is detected, then the coordinate computing process is conducted. If the pen is not detected, then, the existence or non-existence of the finger is detected. In this way, what pointing instrument is used can be recognized, and then the input with either a finger or a pen is available. Moreover, if the existence of a pen is detected, even if both a pen and a finger are detected, the kinds of the pointing instrument is recognized as the pen, so that there is no problem of the hand-touch problem during the pen-input.

Here, it is also possible to use ¼ wavelength phase contrast film in lieu of the vertically polarizing film 40 shown in FIG. 3, and install a vertically polarizing film in front of the image sensor 13. The ¼ wavelength phase contrast film is one in which, when a light goes back and forth therethrough, the polarized light is rotated at 90 degrees. Therefore, in this case, when the horizontally polarized light ray is illuminated, the reflected light from the retroreflective material 4 becomes a vertically polarized light ray, so that the image of the finger 20 as a shadow is taken by the sensor 13. On the other hand, when the vertically polarized light is illuminated, the reflected light from the retroreflective material 4 becomes a horizontally polarized light ray, so that the reflected light from the retroreflective material 4 is not detected by the image sensor 13. However, if the pen 2 which has the retroreflective material 22 is on the coordinate plane 1, then, because the reflected light from the retroreflective material 22 is the vertically polarized light ray, its image is taken by the image sensor 13 via the vertically polarizing film installed in front of the image sensor 13. The configuration in this manner is also capable of performing the same operation as the aforementioned embodiment.

Figure 6:
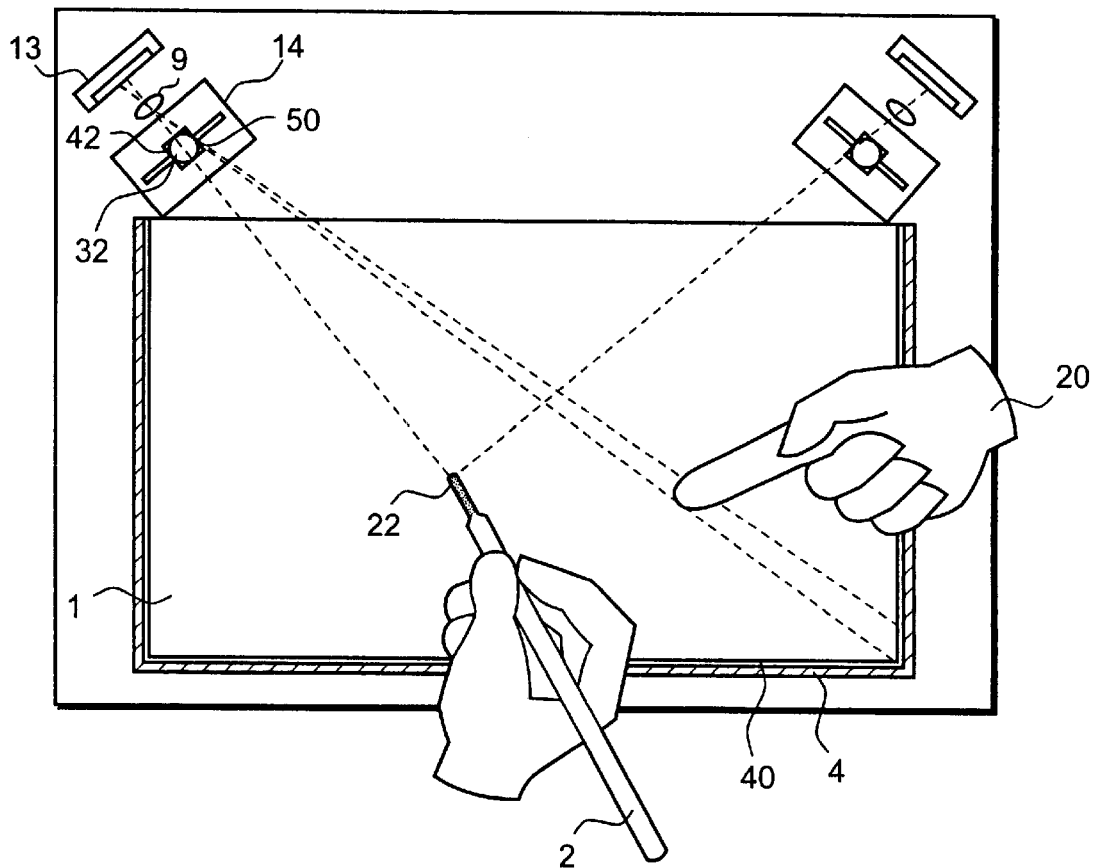
FIG. 6 is a plane view of a second embodiment of the optical digitizer in accordance with the present invention.
Figure 7:
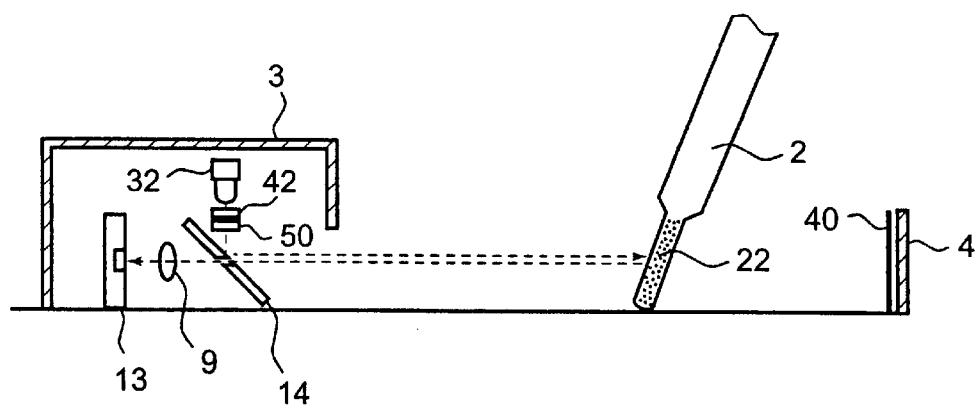
FIG. 7 is a side view of the second embodiment of the optical digitizer as shown in FIG. 4 in accordance with the present invention.

FIG. 6 is a diagrammatic plane view of the second embodiment of the optical digitizer in accordance with the present invention, and FIG. 7 is its schematic side view. In these Figures, those which are attached with the same reference numbers as for the first embodiment indicate the identical component element. In the first embodiment, each detecting unit is configured to have a light source and two polarizing films installed in it, but in this embodiment, a liquid crystal plate 50 is installed on top of the horizontally polarizing film 42 installed at the LED 32, thereby using one light source and one polarizing film in each detecting unit. In other words, in the first embodiment, by switching the LEDs 31 and 32, the vertically polarized light ray and the horizontally polarized light ray are illuminated alternately, but in this embodiment, by turning on/off the voltage applied to the liquid crystal plate 50, the vertically polarized light ray and horizontally polarized light ray are illuminated alternately. The liquid crystal plate 50 used in this embodiment is comprised of a TN (Twisted Nematic) type liquid crystal. The TN-type liquid crystal uses the optical rotation (twist) of the light. The one with the applied voltage being OFF, and the orientation of the liquid crystal molecules being 90 degrees twisted between the plates (top/bottom) may be used in this embodiment. In this manner, the light entered into the liquid crystal is rotated 90 degrees and passed. When the voltage is applied, then the liquid crystal molecules change to the same direction (direction between the plates), and the entered light passes through without being twisted.

The light ray from the LED 32 becomes the horizontally polarized light ray because of the horizontally polarizing film 42, and when the voltage is applied to the liquid crystal plate 50, the light ray is not rotated and passes through the liquid crystal plate 50, and the horizontally polarized light ray enters on the coordinate plane 1. In the case where the voltage is not applied to the liquid crystal, the polarizing axis is rotated at 90 degrees by the liquid crystal plate 50, and the vertically polarized light ray enters on the coordinate plane 1. Other operations are the same as in the first embodiment, that is, the pen 2 is detected by the horizontally polarized light ray, and the finger 20 is detected by the vertically polarized light ray, so that the kinds of the pointing instrument can be recognized. The present embodiment uses only one LED, which has the advantage of making the light source small. Moreover, the light axis of the light source does not change, so that the position alignment is simple, and the computing of the pointed position coordinates does not become complicated, and the margin of error becomes small.

Figure 8:
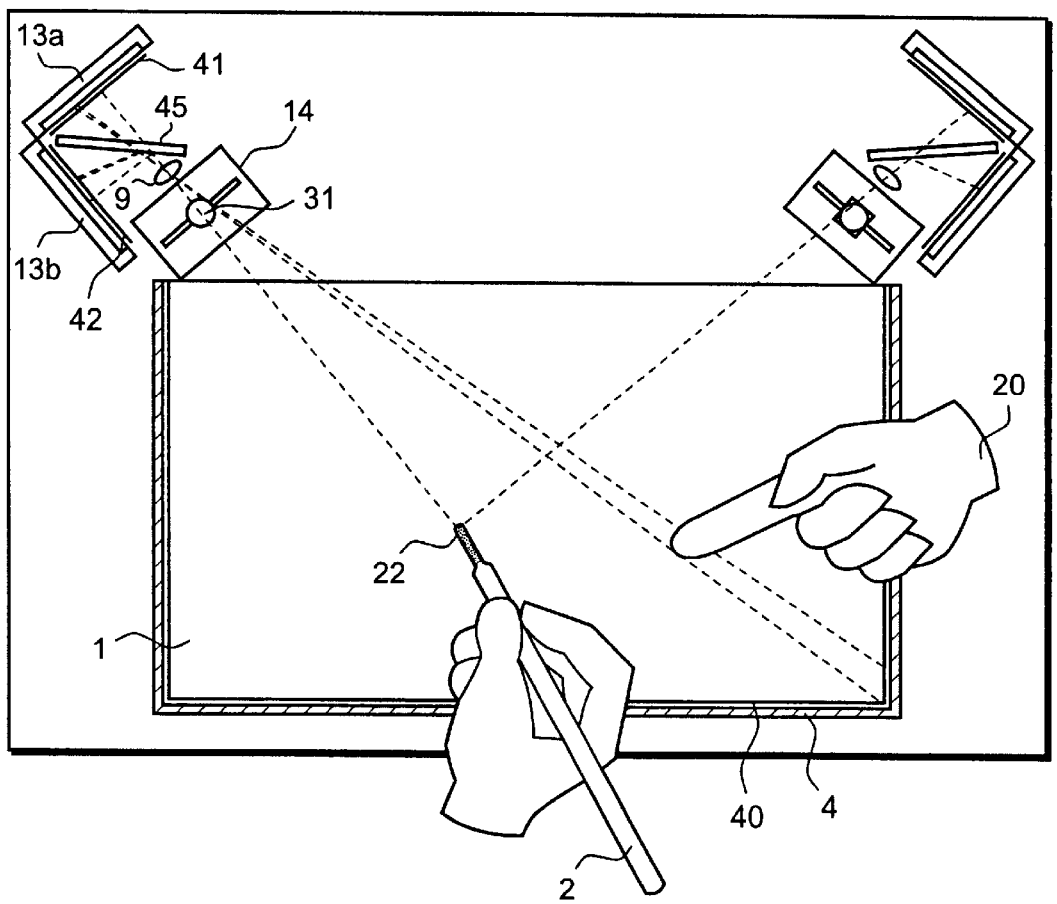
FIG. 8 is a plane view of a third embodiment of the optical digitizer in accordance with the present invention.

FIG. 8 is a diagrammatic plane view of a third embodiment of the optical digitizer in accordance with the present invention. In the aforementioned embodiment, a polarizing film is installed at the light source, but in this embodiment, each detecting unit is equipped with two image sensors, and the polarizing film is installed at the image sensor side. Here, a half mirror 45 is arranged in such a way for the light ray from the coordinate plane 1 to enter into each image forming surface of the two image sensors 13a and 13b, and the vertically polarizing film 41 and horizontally polarizing film 42 are installed to these image sensors 13a and 13b, respectively. In this embodiment, the reflective light of the illuminated light on the coordinate plane 1 becomes the vertically polarized light ray by the vertically polarizing film 40, which is installed at the retroreflective material 4 at the frame of the coordinate plane 1. Consequently, only the image sensor 13a equipped with the vertically polarizing film 41 which causes only the vertically polarized light ray to be transmitted, takes the image of the reflective light of the retroreflective material 4 at the frame of the coordinate plane 1. In the case where the finger 20 is placed on the coordinate plane 1 as the pointing instrument, the image of its shadow can be taken by the image sensor 13a, and the position pointing coordinates of the finger 20 can be detected. On the other hand, when the pen 2 equipped with the retroreflective material 2 at its tip is placed on the coordinate plane 1, the reflective light of the retroreflective material 22 installed at the tip of the pen 2 is taken by the image sensor 13b through the horizontally polarizing film 42. In other words, if the pen 2, which is equipped with the retroreflective material 22, is placed on the coordinate plane 1, it is detected by the image sensor 13b, and if the finger 20 is placed, then it is detected by the image sensor 13a. Thus, it is possible to recognize whether the pointing instrument is a pen which has a retroreflective material, or a finger. Here, in the case where both a pen and a finger are detected simultaneously by the image sensors 13a and 13b, then it is judged as the pen input, so that the hand touch is allowed.

By this configuration, it allows the pointing instrument to be recognized with simple operation and high accuracy, without using a polarized light switching device.

Figure 9:
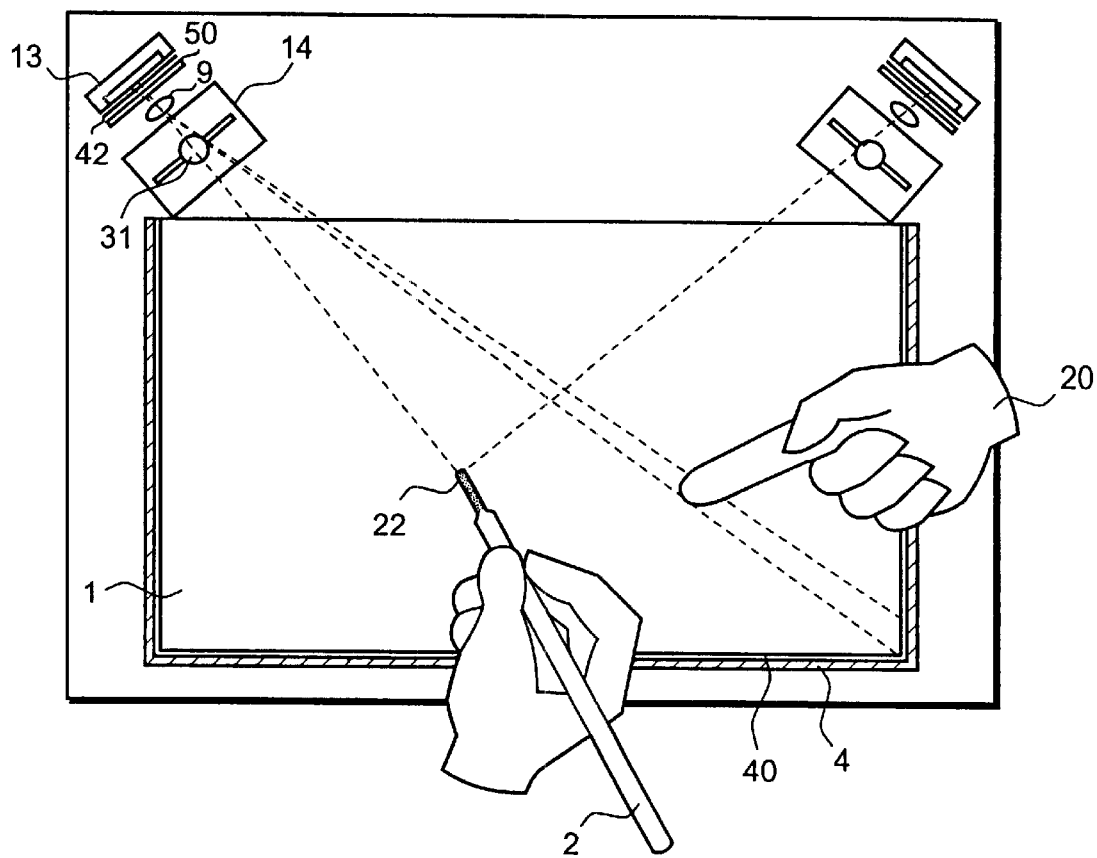
FIG. 9 is a plane view of a fourth embodiment of the optical digitizer in accordance with the present invention.

FIG. 9 is a diagrammatic plane view of a fourth embodiment of the optical digitizer in accordance with the present invention. In the third embodiment, two image sensors are used, but in this embodiment, one image sensor is used, and a liquid crystal plate is installed in front of the polarizing film. The horizontally polarizing film 42 is installed in front of the image sensor 13, and the liquid crystal plate 50 is installed in front of the film. By turning on/off the voltage applied to the liquid crystal plate 50, an image is taken by the image sensor 13 by causing the vertically polarized light ray and horizontally polarized light ray to be transmitted alternately. In this embodiment, too, first the voltage is applied to the liquid crystal plate 50, and only the horizontally polarized light ray is taken by the image sensor 13. When the pen 2 which has the retroreflective material 22 is placed on the coordinate plane 1, the image of the position pointing coordinates of the pen can be taken by the image sensor. If there is no image to be taken by the image sensor 13, then the voltage is not applied to the liquid crystal plate 50, and the digitizer is set for the state to be able to take the image of only the vertically polarizing light ray by the image sensor 13. At this time, if the finger 20 is on the coordinate plane 1, then the image of the shadow of the finger 20 is taken by the image sensor 13. These operations are the same as those shown in the flow chart in FIG. 5, which is used to illustrate the operations for the first embodiment. By configuring the device in this way, the number of the image sensors to be used, which are relatively expensive, can be reduced in comparison to the third embodiment, and thus reducing the cost of the device.

Figure 10:
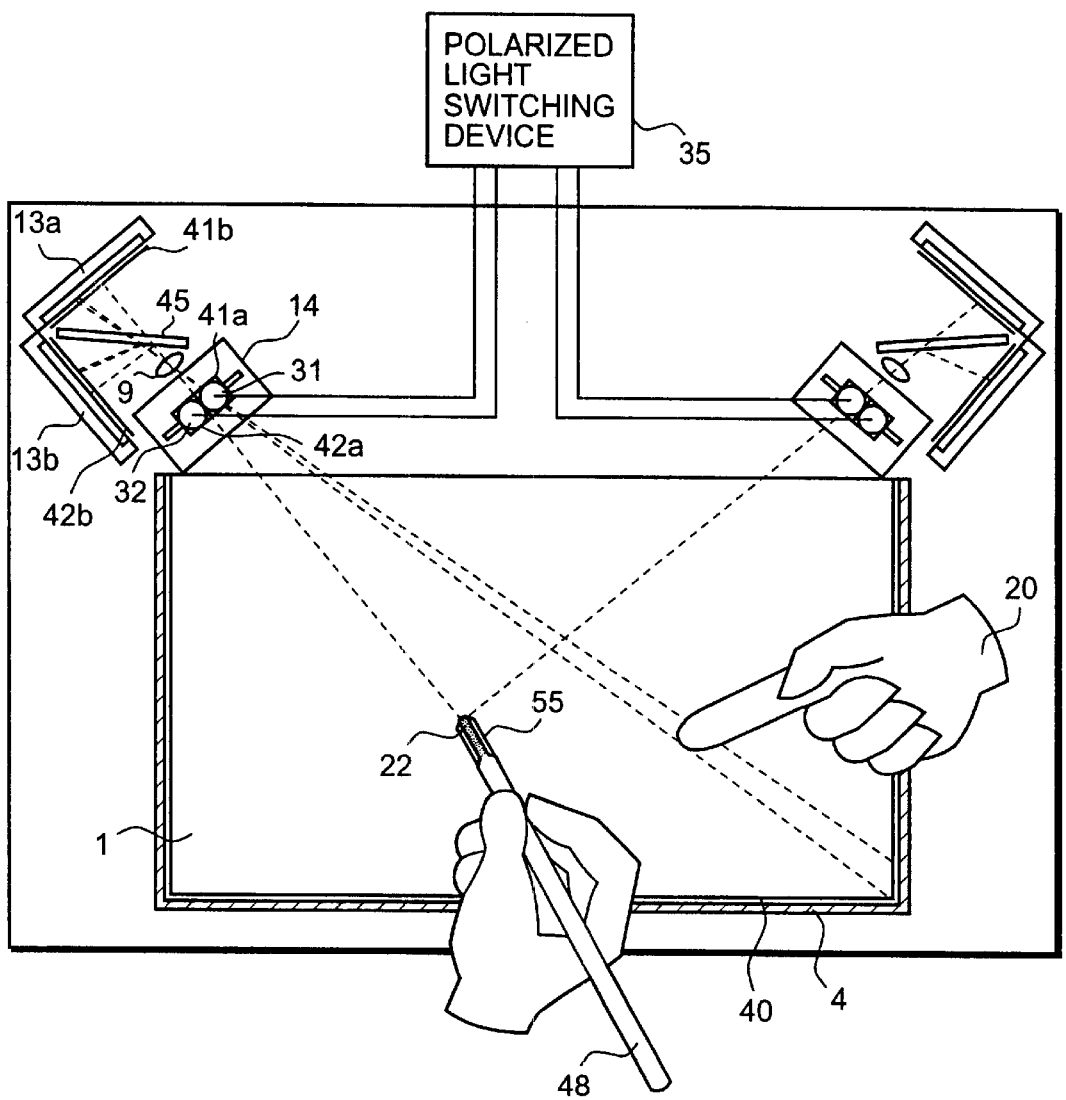
FIG. 10 is a plane view of a fifth embodiment of the optical digitizer in accordance with the present invention.
Figure 11:
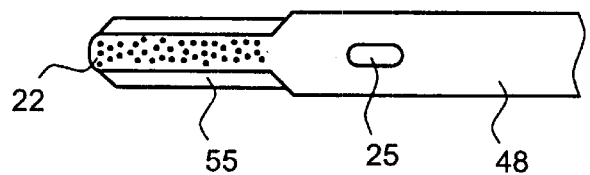
FIG. 11 is a diagrammatic view of a pen used in the fifth embodiment of the optical digitizer shown in FIG. 10 in accordance with the present invention.

FIG. 10 is a diagrammatic plane view of a fifth embodiment of the optical digitizer in accordance with the present invention. FIG. 11 is a detailed drawing of the pointing instrument to be used in this embodiment. The configuration of this embodiment is like a combination of the first and second embodiments. In other words, each detecting unit uses LEDs 31 and 32 as the light sources, and the vertically polarizing film 41a and the horizontally polarizing film 42a are installed to each light source, respectively. Also, two image sensors 13a and 13b are used as an image taking means, a half mirror 45 is arranged in such a manner that the light rays from the coordinate plane 1 enter into the respective image forming surface, and the vertically polarizing film 41b and horizontally polarizing film 42b are installed at each of the image sensors 13a and 13b. The pen 48, which is the pointing instrument used in this embodiment, is equipped with the retroreflective material 22 at its tip, and furthermore, as shown in FIG. 11, is surrounded by the liquid crystal material 55. This liquid crystal material 55 is to rotate the polarizing direction by 45 degrees depending on the existence or non-existence of the applied voltage on it. More specifically, the liquid crystal material 55 is comprised of the TN-type liquid crystal, and the orientation of orientational membranes is differentiated by 45 degrees. Consequently, the incident light entered into the liquid crystal 55 passes therethrough with a 45 degree rotation depending on the existence or the non-existence of the applied voltage. As in the case of the first embodiment, the LEDs 31 and 32 are connected to the polarizing light switching device 35, and the two LEDs are caused to be emitted alternately, and thus the vertically polarizing light ray and the horizontally polarized light ray are alternately illuminated. When the LED 31 emits the light and only the vertically polarizing light ray is illuminated, there is reflective light from the retroreflective material 4 installed at the frame of the coordinate plane 1 via the vertically polarizing film 40, so that the image of the reflected light is taken by the image sensor 13a via the vertically polarizing film 41b. Here, if the finger 20 is placed on the coordinate plane 1, the image of its shadow is taken by the image sensor 13a, the result is converted into the electrical signal, and the pointing position coordinates can be detected. When the LED is switched by the polarizing light switching device 35 and the LED 32 emits the light, the horizontally polarizing light is illuminated. Although there is no reflected light from the frame of the coordinate plane 1, if the pen 48, in which the voltage is applied to the liquid crystal material installed at its tip, is placed on the coordinate plane 1, the polarizing axis of the horizontally polarized incident light ray rotates 45 degrees by the liquid crystal material 55. Moreover, the light ray reflected from the retroreflective material 22 rotates 45 degrees again by the liquid crystal material 55, so after all it rotates 90 degrees and becomes the vertically polarizing light ray, and returns from the pen 48. In this case, the position pointing coordinates of the pen can be detected by the image sensor 13a via the vertically polarizing film 41b. By pressing the switch 25 of the pen 48, the voltage is applied to the liquid crystal material 55, then the light passes straight through the liquid crystal material 55, and the reflected light from the retroreflective material 22 enters into the image sensor 13b via the horizontally polarizing film 42b. In this case, the position pointing coordinates of the pen can be detected by the image sensor 13b.

By configuring in this way, at least three kinds of pointing instruments can be recognized. In other words, the differences in the finger 20, the pen 48 without being applied voltage, and the pen 48 with being applied voltage can be recognized, so that the supplemental information on the pointing instrument, for example, may be transmitted. Therefore, if this embodiment is applied to an electronic whiteboard, the normal input by pen 48 is to be black color input, the input is turned into the red input by pressing the switch 25, and further a finger input is as a function of an eraser, so that an excellent whiteboard with good input efficiency can be obtained.

The detecting unit section in this embodiment can be configured as the fourth embodiment shown in FIG. 9. By configuring the device in this manner, the number of the image sensors to be used may be reduced.

The present invention is not limited to the above illustrated representations, and may be embodied in several forms without departing from the spirit of the essential characteristics thereof. For example, instead of using the vertically polarizing film 40 as shown in FIG. 3, it is possible to configure the device by using the retroreflective material 4 installed at the frame of the coordinate plane 1 in which the reflective efficiency rate is inferior to the reflective efficiency rate of the retroreflective material installed at the tip of the pen 2. In this case, the kinds of the pointing instruments can be recognized by the strength of the light ray of the image taken by the image sensor 13. In other words, when an image of a light ray is stronger than the predetermined threshold level, it is judged to be the reflective light coming from the retroreflective material 22 installed at the tip of the pen 2, and the pen coordinate computing process is conducted. In the case where a light ray weaker than the threshold level is detected, it is judged that there is no pen on the coordinate plane 1, and the light is judged to be the reflective light from the retroreflective material 4 installed at the frame of the coordinate plane 1. Then it judges whether a shadow 20a exists, and if there is a shadow, then the finger coordinate computing process is conducted. By configuring the device in this manner, the recognition of the kinds of the pointing instruments may be achieved as in the cases of the aforementioned embodiments.

As described heretofore, the optical digitizer in accordance with the present invention has the recognizing function of the kinds of the pointing instruments, to enable the input either by a pen or by a finger. In the case of the pen input, this invention is free from the hand-touch problem. Moreover, the present invention allows for the transmittance of supplemental information, it is possible to cause a pen to have a plurality of functions.

While a preferred embodiment of the invention has been described using specific terms, such description is for illustrative purposes only, and it is to be understood that changes and variations may be made without departing from the spirit or the scope of the following claims.

What is claimed is:

1. An optical digitizer with a function to recognize kinds of pointing instruments for detecting pointing position coordinates of the pointing instrument on a coordinate plane, said pointing instruments including a first pointing instrument not equipped with a retroreflective material at a tip of said first pointing instrument, and a second pointing instrument equipped with a retroreflective material at a tip of said second pointing instrument, said optical digitizer comprising:

a light source means which emits a light ray;

an image taking means which is positioned at a periphery of said coordinate plane, and which is adapted to use said light ray of said light source to take an image of said pointing instrument and to convert it into an electrical signal;

a computing means which processes said electrical signal converted by said image taking means, and which computes said pointing position coordinates of said pointing instrument;

a polarizing means which is installed at said light source means, and which is adapted to make said light ray emitted from said light source means as one of a first polarized light ray and a second polarized light ray;

a switching means which switches said light ray emitted to said coordinate plane into one of said first polarized light ray and said second polarized light ray;

a retroreflective means which is installed at a frame of said coordinate plane, and which has retroreflective characteristics;

a polarizing film which is installed in front of said retroreflective means, and which has a transmitting axis to cause said first polarized light ray to be transmitted; and a judging means which judges said pointing instrument as said first pointing instrument if said image of said pointing instrument is taken by said first polarized light ray, and which judges said pointing instrument as said second pointing instrument if said image of said pointing instrument is taken by said second polarized light ray.

2. An optical digitizer with a function to recognize kinds of pointing instruments as claimed in claim 1, wherein said light source means comprises two light sources, and wherein said polarizing means comprises a first polarizing portion which causes said first polarized light ray to be transmitted, and a second polarizing portion which causes said second polarized light ray to be transmitted, said first and second polarizing portions being installed at said two light sources respectively, and said first polarized light ray and said second polarized light ray being irradiated by switching an irradiation of said two light sources through said switching means.

3. An optical digitizer with a function to recognize kinds of pointing instruments as claimed in claim 2, wherein said first polarized light ray is a vertically polarized light ray, and said second polarized light ray is a horizontally polarized light ray.

4. An optical digitizer with a function to recognize kinds of pointing instruments as claimed in claim 1, wherein said polarizing means comprises a first polarizing portion which causes said first polarized light ray to be transmitted, and a liquid crystal plate, and irradiates said first polarized light ray and said second polarized light ray by switching a voltage applied to said liquid crystal plate through said switching means.

5. An optical digitizer with a function to recognize kinds of pointing instruments as claimed in claim 3, wherein said first polarized light ray is a vertically polarized light ray, and said second polarized light ray is a horizontally polarized light ray.

6. An optical digitizer with a function to recognize kinds of pointing instruments for detecting pointing position coordinates of the pointing instrument on a coordinate plane, said pointing instruments including a first pointing instrument not equipped with a retroreflective material at a tip of said first pointing instrument, and a second pointing instrument equipped with a retroreflective material at a tip of said second pointing instrument, said optical digitizer comprising:

a light source means which emits a light ray;

an image taking means which is positioned at a periphery of said coordinate plane, and which is adapted to use said light ray of said light source to take an image of said pointing instrument and to convert it into an electrical signal;

a computing means which processes said electrical signal converted by said image taking means, and which computes said pointing position coordinates of said pointing instrument;

a polarizing means which is installed at said image taking means, and which polarizes incident light into said image taking means as one of a first polarized light ray and a second polarized light ray;

a dividing means which divides said incident light to said image taking means;

a retroreflective means which is installed in a frame of said coordinate plane, and which has retroreflective characteristics;

a polarizing film which is installed in front of said retroreflective means, and which has a transmitting axis to cause said first polarized light ray to be transmitted; and a judging means which judges said pointing instrument as said first pointing instrument if said image of said pointing instrument is taken by said first polarized light ray, which judges said pointing instrument as said second pointing instrument if said image of said pointing instrument is taken by said second polarized light ray, and which judges said pointing instrument as said second pointing instrument if said image is taken by both said first polarized light ray and said second polarized light ray.

7. An optical digitizer with a function to recognize kinds of said pointing instruments as claimed in claim 6, wherein said image taking means comprises two image taking devices, wherein said polarizing means comprises a first polarizing portion which causes said first polarized light ray to be transmitted, and a second polarizing portion which causes said second polarized light ray to be transmitted, and wherein said dividing means comprises a half mirror, thereby causing said incident light into said image taking means to enter into said first polarizing portion and said second polarizing portion respectively by said half mirror, and said image of said first polarized light ray and said second polarized light ray being taken by each image taking device.

8. An optical digitizer with a function to recognize kinds of said pointing instruments as claimed in claim 7, wherein said first polarized light ray is a vertically polarized light ray, and said second polarized light ray is a horizontally polarized light ray.

9. An optical digitizer with a function to recognize kinds of pointing instruments as claimed in claim 6, wherein said polarizing means comprises a first polarizing portion which causes said first polarized light to be transmitted, and a liquid crystal plate, said first polarized light ray and said second polarized light ray entering into said image taking means by switching voltages applied to said liquid crystal plate through said dividing means, and said image of each incident light being taken alternately by said image taking means.

10. An optical digitizer with a function to recognize kinds of said pointing instruments as claimed in claim 8, wherein said first polarized light ray is a vertically polarized light ray, and said second polarized light ray is a horizontally polarized light ray.

11. An optical digitizer with a function to recognize kinds of pointing instruments as claimed in claim 6, wherein said light source means comprises two light sources, and wherein said optical digitizer further comprises a third polarizing portion which causes said first polarized light ray to be transmitted and is installed at one of said two light sources, a fourth polarizing portion which causes said second polarized light ray to be transmitted and installed at the other of said two light sources, and a switching means to cause said two light sources to emit light rays alternately, said second pointing instrument being equipped with a liquid crystal material and, said optical digitizer still further comprising a judging means to judge in the case where said image of said second pointing instrument is taken by said second polarized light ray, a state of said second pointing instrument by incident polarized light which enters into said image taking means, and which varies in accordance with a voltage applied to said liquid crystal plate.

12. An optical digitizer with a function to recognize kinds of said pointing instruments as claimed in claim 9, wherein said first polarized light ray is a vertically polarized light ray, and said second polarized light ray is a horizontally polarized light ray.

13. An optical digitizer with a function to recognize kinds of pointing instruments for detecting pointing position coordinates of the pointing instrument on a coordinate plane, said pointing instruments including a first pointing instrument not equipped with a retroreflective material at a tip of said first pointing instrument, and a second pointing instrument equipped with a retroreflective material at a tip of said second pointing instrument, said optical digitizer comprising:

a light source which emits a light ray;

an image taking means which converts an image into an electrical signal after taking an image of said pointing instrument by using said light ray of said light source;

a computing means which computes said pointing position coordinates by processing said electrical signal converted by said image taking means;

a polarizing means which is installed at said light source, and which is adapted to make said light ray emitted by said light source as one of a first polarized light ray and a second polarized light ray;

a switching means which switches said light ray emitted to said coordinate plane into one of said first polarized light ray and said second polarized light ray;

a retroreflective means which is installed in a frame of said coordinate plane, and which has retroreflective characteristics;

a ¼ wavelength phase contrast film which is installed in front of said retroreflective means;

a polarizing film which is installed in front of said image taking means, and which has a transmitting axis to cause said first polarized light ray to be transmitted; and a judging means which judges said pointing instrument as said first pointing instrument if said image of said pointing instrument is taken by said second polarized light ray, and which judges said pointing instrument as said second pointing instrument if said image of said pointing instrument is taken by said first polarized light ray.

14. An optical digitizer with a function to recognize kinds of pointing instruments as claimed in claim 13, wherein said first polarized light ray is a vertically polarized light ray, and said second polarized light ray is a horizontally polarized light ray.

15. An optical digitizer with a function to recognize kinds of pointing instruments for detecting pointing position coordinates of the pointing instrument on a coordinate plane, said pointing instruments including a first pointing instrument not equipped with a retroreflective material at a tip of said first pointing instrument, and a second pointing instrument equipped with a retroreflective material at a tip of said second pointing instrument, said optical digitizer comprising:

a light source which emits a light ray;

an image taking means which is positioned at a periphery of said coordinate plane, and which is adapted to use said light ray of said light source to take an image of said pointing instrument and to convert it into an electrical signal;

a computing means which computes said pointing position coordinates by processing said electrical signal converted by said image taking means;

a retroreflective means which is installed in a frame of said coordinate plane, and which has a retroreflective efficiency inferior to that of said retroreflective material of said second pointing instrument; and judging means which judges said pointing instrument as said first pointing instrument if said image of said pointing instrument is taken by a light ray weaker than a predetermined threshold level, and which judges said pointing instrument as said second pointing instrument if said image of said pointing instrument is taken by a light ray stronger than a predetermined threshold level.

\* \* \* \* \*